US006698143B2

(12) United States Patent
Jensen et al.

(10) Patent No.: US 6,698,143 B2
(45) Date of Patent: Mar. 2, 2004

(54) FLASHING APRON FOR GRAIN BINS

(75) Inventors: Thomas J. Jensen, Sheffield, IA (US); Steven E. Sukup, Dougherty, IA (US)

(73) Assignee: Sukup Manufacturing Company, Sheffield, IA (US)

( * ) Notice: Subject to any disclaimer, the term of this patent is extended or adjusted under 35 U.S.C. 154(b) by 0 days.

(21) Appl. No.: 10/154,479

(22) Filed: May 22, 2002

(65) Prior Publication Data

US 2003/0217520 A1 Nov. 27, 2003

(51) Int. Cl.[7] .............................. E04B 7/00; E04H 7/00
(52) U.S. Cl. ............................................. 52/82; 52/192
(58) Field of Search ...................................... 52/82, 192

(56) References Cited

U.S. PATENT DOCUMENTS

| | | | | |
|---|---|---|---|---|
| 1,096,442 A | * | 5/1914 | Martin | 52/19 |
| 1,267,679 A | * | 5/1918 | McGaffee | 52/82 |
| 1,907,268 A | * | 5/1933 | Schwemlein | 220/693 |
| 2,073,358 A | * | 3/1937 | Williamson | 52/82 |
| 2,135,437 A | * | 11/1938 | Bangert | 52/82 |
| 2,208,973 A | * | 7/1940 | Gurney | 52/82 |
| 2,288,809 A | * | 7/1942 | Larkin | 52/82 |
| 2,357,705 A | * | 9/1944 | Thorne | 454/177 |
| 4,192,107 A | * | 3/1980 | Wickstrom et al. | 52/82 |

OTHER PUBLICATIONS

BROCK—Farm Grain Bin Construction Manual, USA.
SUPERIOR Equipment Manufacturing Co., Inc.—Erection Manual, Drying Bins and Storage Bins, USA.
GROWMARK—Construction Manual, Jun., 1999,, USA.
BROCK—Farm Grain Bin Construction Manual, Aug. 1997, USA.
Butler Manufacturing Company—Corrugated Grain Tank Assembly Manual, USA.
EATON (Conrad American)—Installation Guide & Operator's Manual, Grand Island, NE, USA.
WESTEEL, Wide Corr Grain Bin—Series 60 Owners and Users Manual, USA.
CHIEF Industries, Inc.—Storage Bin Erection Manual, USA.
GSI—30 Degree Roof Construction Manual, Sep., 2001—USA.
BROCK—Farm and Commercial Grain Bin Single Span Roof, May, 1998, USA.

* cited by examiner

*Primary Examiner*—Carl D. Friedman
*Assistant Examiner*—Kevin McDermott

(57) ABSTRACT

A flashing apron for use in grain bins roofs which has apron segments comprised of a single sheet of metal with a plurality of spaced crease lines therein wherein the crease lines create a plurality of truncated areas in an upper surface of the apron segment. Each apron segment has a side edge comprising a downwardly bent lip which fits underneath a side edge of an adjacent apron segment which is planar in shape and which lies on or above the bent lip. Suitable fasteners are provided to secure the apron segments together to create a composite flashing apron for mounting around the circular ring at the apex of the grain bin roof.

2 Claims, 4 Drawing Sheets

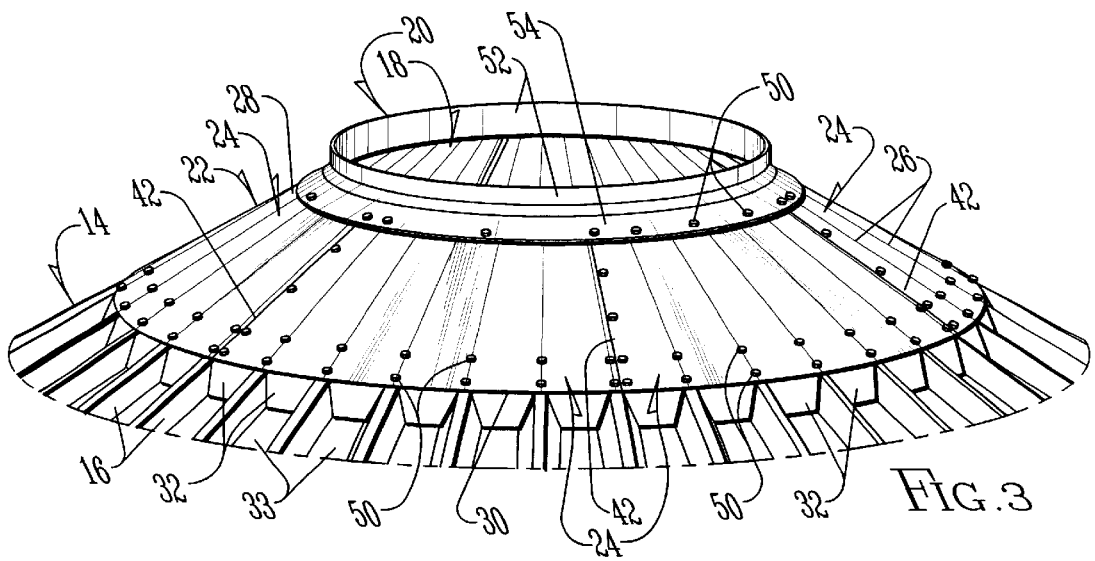
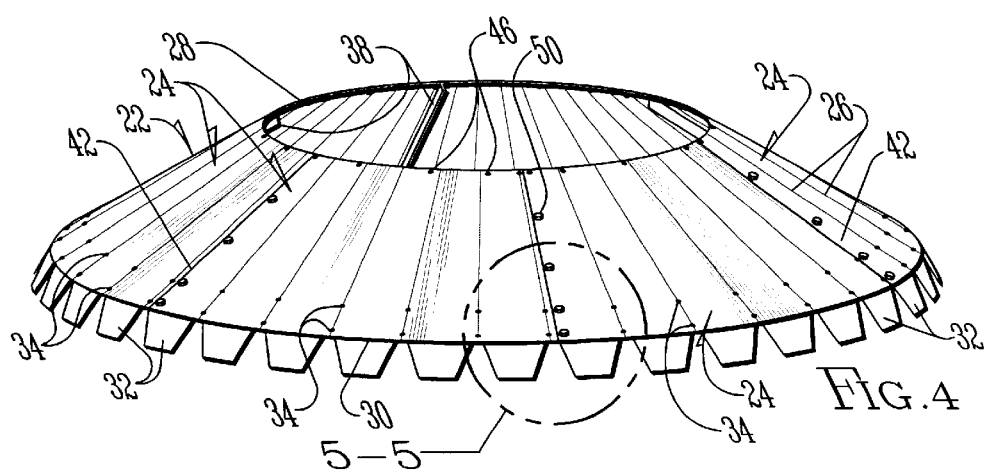

FLASHING APRON FOR GRAIN BINS

BACKGROUND OF THE INVENTION

The roofs of conventional grain storage and drying bins typically assume the shape of an inverted cone mounted upon a cylindrical vertical wall structure with a center opening at the apex of the cone to receive the grain. A horizontal metal ring typically surrounds the center opening of the roof. Triangular shaped roof panels extend upwardly from the upper rim of the cylindrical wall of the bin towards the center ring. An apron or flashing of metal material then typically seals the ring and the upper ends of the roof panels to prevent moisture from entering the bin.

Various ways have been devised to provide the flashing or apron for such bins. However, many of these devices are expensive to manufacture or difficult to install, and do not have the requisite strength for such a structure.

It is therefore a principal object of this invention to provide a flashing apron for use in grain bin roofs which are very strong and which are easily assembled for connection with a center ring and the roof panels of grain bins.

These and other objects will be apparent to those skilled in the art.

BRIEF SUMMARY OF THE INVENTION

A flashing apron for use in grain bins roofs which have an inverted conically shaped roof is comprised of a plurality of truncated roof panels having upper ends which are secured to a circular horizontal ring at the apex of the roof. The apron has a plurality of truncated shaped apron segments having opposite concentric arcuate upper ends and lower ends with the length of curvature of the upper ends being less than that of the lower ends. Thus, when the apron segments are assembled in juxtaposition, a composite truncated flashing apron is formed having a circular upper opening of a smaller diameter than its lower circular opening. The apron segments extend downwardly and outwardly from the upper ends.

Each apron segment is comprised of a single sheet of metal with a plurality of spaced crease lines therein wherein the crease lines create a plurality of truncated areas in an upper surface of the apron segment. Each apron segment has a side edge comprising a downwardly bent lip which fits underneath a side edge of an adjacent apron segment which is planar in shape and which lies on or above the bent lip. Suitable fasteners are provided to secure the apron segments together to create a composite flashing apron for mounting around the circular ring at the apex of the grain bin roof.

BRIEF DESCRIPTION OF THE DRAWINGS AND PHOTOS

FIG. 3 is an enlarged scale view of the portion 3—3 of FIG. 1 showing the assembled apron mounted around the upper ring and connected to the upper ends of the individual roof panels;

FIG. 4 is a perspective view similar to that of FIG. 3 but shows only the assembled truncated apron;

DESCRIPTION OF THE PREFERRED EMBODIMENTS

Figure 1:
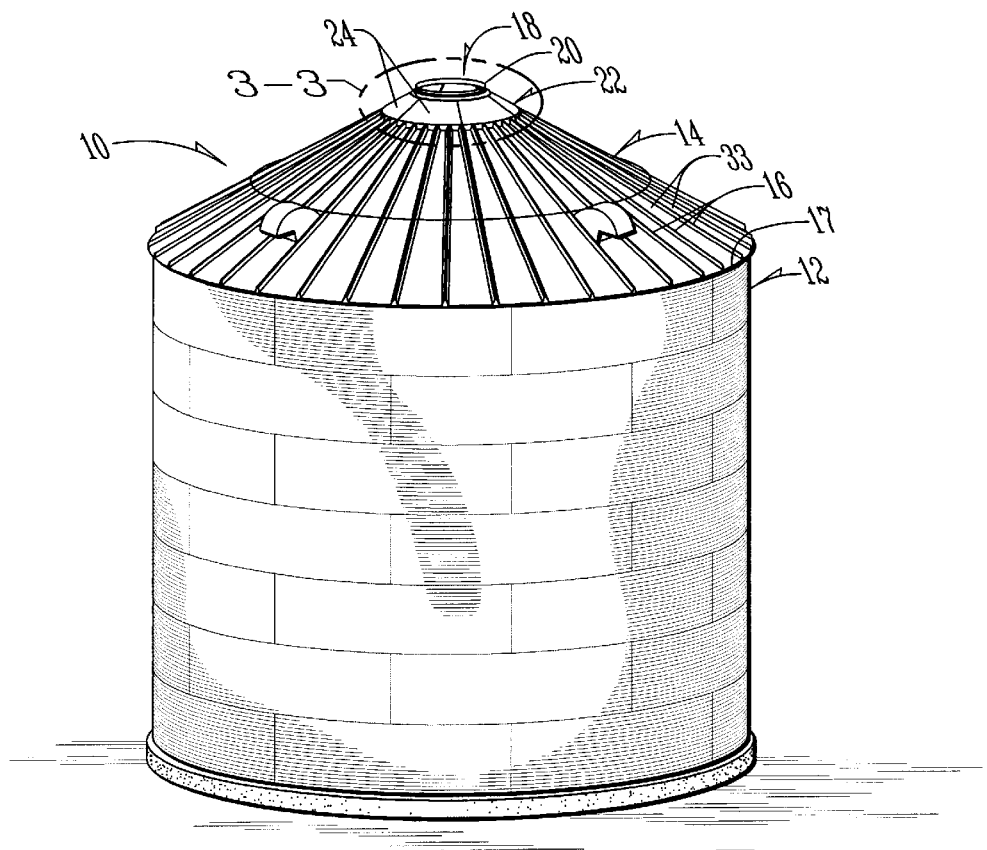
FIG. 1 is a perspective view of a grain bin embodying the present invention.
Figure 2:
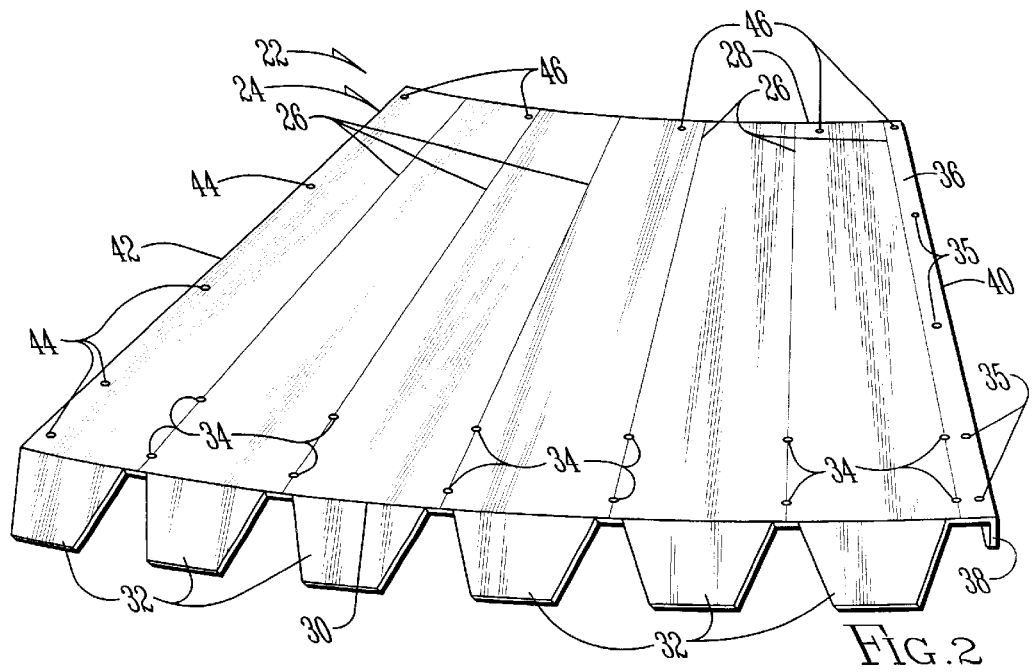
FIG. 2 is an enlarged scale perspective view of an apron segment.
Figure 6:
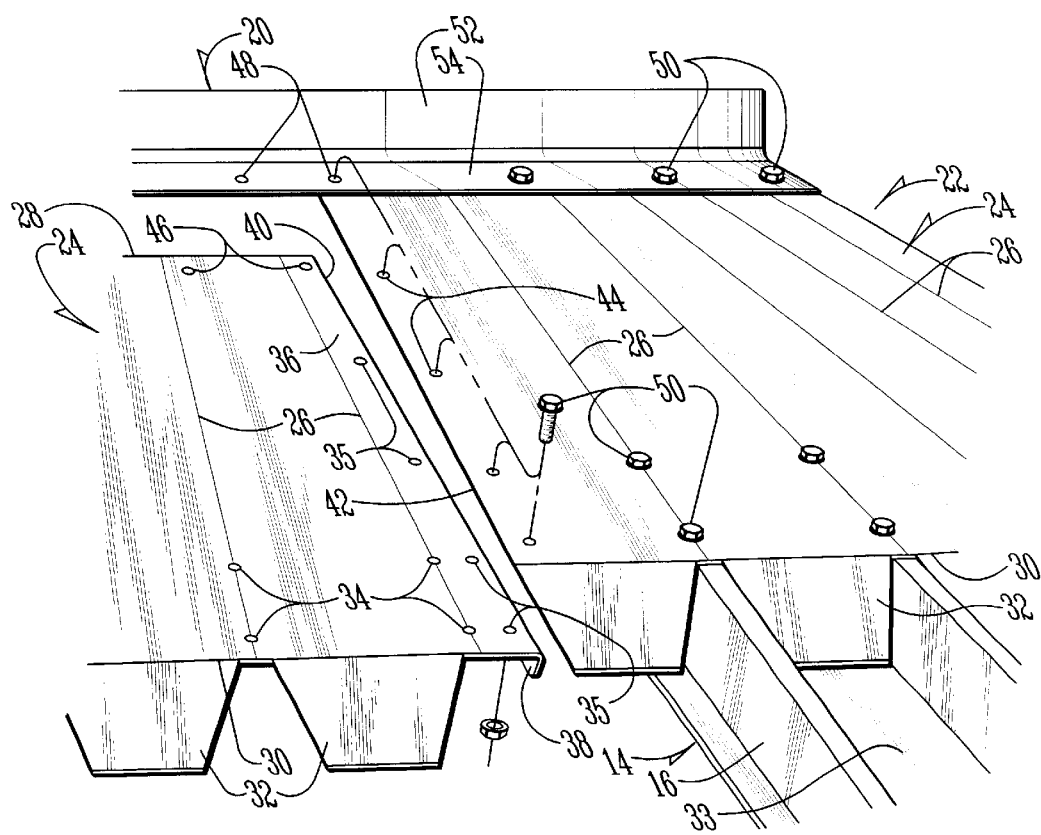
FIG. 6 is a view similar to that of FIG. 5 but shows how the individual apron segments are secured to adjacent apron segments throughout the full length of the apron segments.
Figure 7:
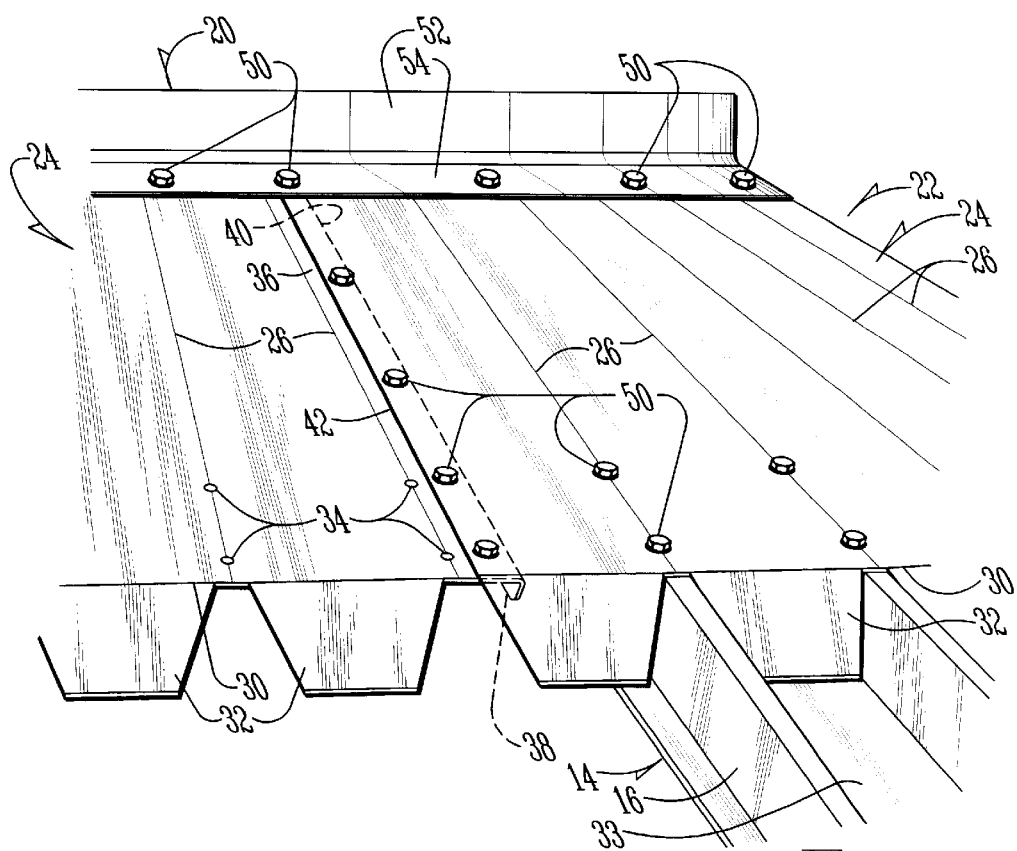
FIG. 7 is a view similar to that of FIG. 6 but shows the apron segments being secured together.

With reference to FIG. 1, a bin 10 is comprised of a cylindrical vertical side wall 12 with an inverted conical shaped roof 14. The roof 14 is comprised of a plurality of truncated roof panels 16 which extend upwardly and inwardly from the top edge 17 of the side walls 12. A center opening 18 appears at the apex of the conical roof 14 and a center ring 20 extends around the center opening 18. As best shown in FIG. 3, a flashing apron 22 extends around the center ring 20 and extends downwardly and outwardly therefrom. The flashing apron 22 is comprised of a plurality of apron segments 24. The apron segment 24, as shown in FIG. 2, includes a plurality of longitudinal creases 26 which extend downwardly and outwardly in truncated fashion from the center ring 20. The longitudinal creases 26 increase the strength of the flashing apron between its upper curved end 28 and its lower curved end 30. The curvature of the upper and lower ends of the apron are concentric. Truncated shaped tabs 32 are formed at the lower ends of the flashing apron 22 in between the lower ends of the longitudinal creases 26. As shown in FIGS. 6 and 7, the truncated tabs extend downwardly into the trough portions 33 of the roof panels 16. The shape of the tabs is complementary to the cross sectional shape of the troughs.

Punched holes 34 are located towards the lower ends of the longitudinal creases 26 to receive suitable bolts for affixing the flashing apron 22 to the roof panels 16 as will be described hereafter.

Figure 5:
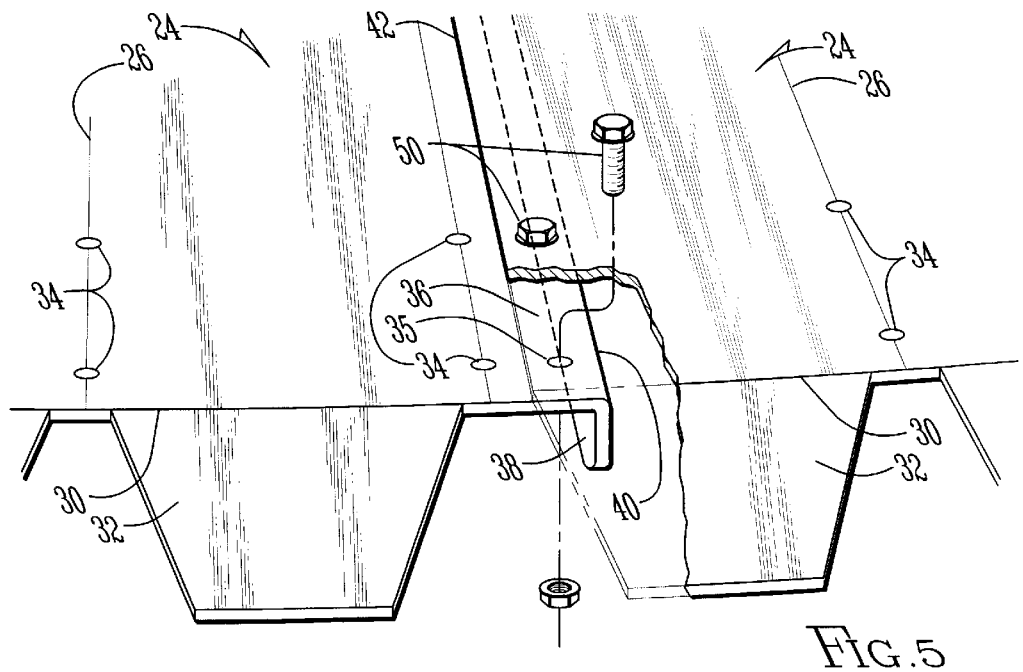
FIG. 5 is an enlarged scale portion defined by the lines 5—5 of FIG. 4 with portions thereof cut away to illustrate the manner in which the apron segments are secured together.

A flat portion 36 appears along one edge 40 of the apron and has a downwardly extending bent lip 38 (FIG. 2). The opposite edge 42 of the flashing apron 22 is flat in nature and has a plurality of punched holes 44 to register with the punched holes 35 on the next adjacent flashing apron. The registering of the holes 35 and the holes 44 is best shown in FIGS. 5 and 6. With reference to FIG. 2, punched holes 46 are adapted to register with holes 48 (FIG. 6) in the downwardly and outwardly extending flange 54 (FIG. 7) of center ring 20 to permit a bolt to be inserted therein for fastening purposes. Bolts 50 are suitable for making all of the connections between the apron and the ring and the roof panels. The downwardly and outwardly extending flange 54 of center ring 20 (FIG. 7) is integral with the upstanding vertical flange 52 of the ring 20. FIGS. 5 and 6 show in detail how the various apron segments 24 are secured together and are secured to the ring 20. The downwardly bent lip 38 on one edge of the apron segment serves to stiffen the connection between two adjacent apron segments. The location of the lips 38 on one side edge of the apron also insures that the apron will be assembled correctly. The lips 38 also stiffen the apron 22 in a direction between the top edge of the roof 14, and the center ring 20. The bolts 50 which effect this connection are best shown in FIGS. 5 and 6. Similarly, bolts 50 are used to connect the upper end of the apron 22 with the ring 20 as best shown in FIGS. 6 and 7.

From the foregoing, it is seen that the longitudinal creases 26 add strength to the center portion of each apron segment 24. Similarly, the downwardly bent lip 38 adds stiffness and strength to the assembled apron structure, and insures the proper assembly thereof.

Accordingly, this invention will achieve at least all of its stated objectives.

What is claimed is:

1. A flashing apron for use in grain bin roofs which have an inverted conically shaped roof comprised of a plurality of truncated roof panels having upper ends which are secured to a circular horizontal ring collar at the apex of the roof, comprising, a plurality of truncated shaped apron segments having concentric arcuate upper ends and lower ends with the radius of the upper ends being less than that of the lower ends, so that when the apron segments are assembled in juxtaposition, a composite truncated flashing apron is formed having a circular upper opening of a smaller diameter than a circular lower opening, and the apron segments extend downwardly and outwardly from their upper ends, each apron segment being comprised of single sheet of metal with a plurality of spaced crease lines therein wherein the crease lines create a plurality of truncated areas in an upper surface of the apron segment, each apron segment having a side edge comprising a downwardly bent lip which is at a right angle with respect to the apron segment and fits underneath a side edge of an adjacent apron segment which is planar in shape and which lies on and above the bent lip, and means for securing the apron segments together to create a composite flashing apron for mounting around a circular ring collar at the apex of a grain bin roof.

2. A flashing apron for use in grain bin roofs which have an inverted conically shaped roof comprised of a plurality of truncated roof panels having upper ends which are secured to a circular horizontal ring collar at the apex of the roof, comprising, a plurality of truncated shaped apron segments having concentric arcuate upper ends and lower ends so that when the apron segments are assembled in juxtaposition, a composite truncated flashing apron is formed having a circular lower opening, and the apron segments extend downwardly and outwardly from their upper ends, each apron segment having a side edge comprising a downwardly bent lip which is at a right angle with respect to the apron segment and fits underneath a side edge of an adjacent apron segment which is planar in shape and which lies on and above the bent lip, means for securing the apron segments together to create a composite flashing apron for mounting around a circular ring collar at the apex of a grain bin roof.

* * * * *